Dec. 23, 1924.
W. BREWSTER
1,520,389
CONSTRUCTION OF INCLOSED DRIVE AUTOMOBILE BODIES
Filed May 24, 1924
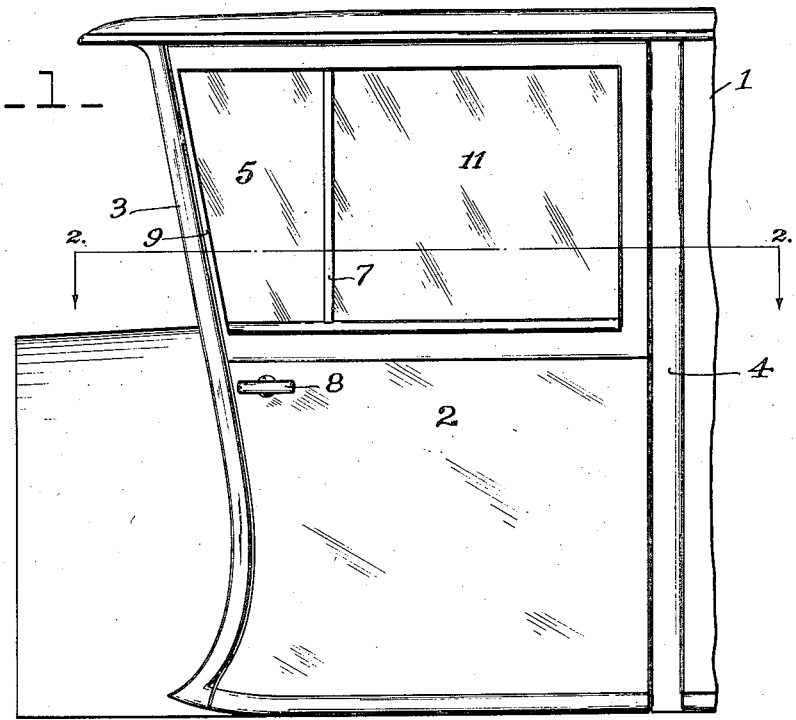
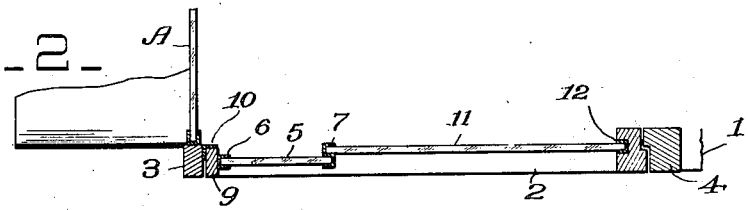
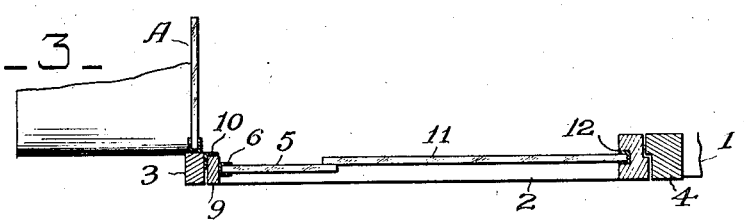
Inventor
William Brewster
by
Attorney Patented Dec. 23, 1924.

1,520,389

UNITED STATES PATENT OFFICE.

WILLIAM BREWSTER, OF NEW YORK, N. Y.

CONSTRUCTION OF INCLOSED DRIVE AUTOMOBILE BODIES.

Application filed May 24, 1924. Serial No. 715,502.

*To all whom it may concern:*

Be it known that I, WILLIAM BREWSTER, a citizen of the United States, residing at the city of New York, in the county of New York and State of New York, have invented certain new and useful Improvements in the Construction of Inclosed Drive Automobile Bodies; and I do declare the following to be a full, clear, and exact description of the invention, such as will enable others skilled in the art to which it appertains to make and use the same.

This invention relates to the construction of inclosed automobile bodies, but has special reference to the manner of constructing the forward part of an inclosed drive body with the end in view to eliminate the comparatively wide opaque portions at the front corners of the body, and to provide for unobstructed vision at such corners.

Heretofore, many accidents have occurred, for the reason that a driver did not see an approaching car, particularly at an intersecting street or where such car suddenly turned out from a curb, this being due to the fact that the vision of the driver was obstructed by the comparatively wide opaque portions at the corner of the automobile body.

It is the especial object of this invention to render accidents, due to this cause, impossible.

In the accompanying drawings which illustrate the manner in which the invention is carried out, Figure 1 is a side elevation of the inclosed drive portion of an automobile body constructed in accordance with the invention—

Figure 2 is a section at the line 2—2 of Figure 1, and

Figure 3 is a section similar to Figure 2, but showing a modification so far as the assembly of the glass panes in the door is concerned.

Similar numerals of reference denote like parts in the several figures of the drawing.

Referring to Figures 1 and 2 of the drawing, 1 generally denotes the automobile body, 2 the front door, 3 the pillar for the windshield A, and 4 the rear door casing.

At Figure 1 the pillar 3 is inclined merely to accommodate an inclined windshield, but this pillar could, of course, be vertical to accommodate the usual vertical style of windshield.

The upper portion of the door 2 has a fixed glass pane 5 which is confined laterally within a guide 6 fixed to the door near its edge and a vertical guide 7 carried by the door.

This glass pane 5 is immediately above the latch structure whose operating handle is denoted by the numeral 8, and therefore it will be clear that such pane could not be lowered without interference with such structure.

The front edge of the door which bounds the opening for the glass consists of a narrow strip 9 to which the guide 6 is fixed, this strip being inclined to conform to the pillar 3, and in closed position this strip abuts against a stop 10 that is fixed to the windshield pillar 3.

The guide 7 is S-shaped so as to provide two grooves one for the rear edge of the fixed pane 5 and the other for the vertically slidable pane 11. The rear side edge of this pane extends within a guide strip 12 that is fixed within the rear edge of the door opening, and this pane 11 can be lowered or elevated in the usual manner and will slide within the guides 7 and 12.

The width of the guide 7 is very small being not over half an inch, and the combined width of the strip 9, guide 6, and windshield pillar 3 is very little, aggregating possibly an inch and a half, so that it will be clear that the vision of the driver of the car will not be appreciably obstructed by any opaque portions at the front corners thereof.

The invention is illustrated in connection with a windshield which is slanted forwardly from the bottom, but, of course, it will be readily understood that if the windshield slanted in the opposite direction, the invention herein would be followed in precisely the same manner.

As hereinbefore noted, a rectangular door would be used in instances where the windshield was vertical, and in this connection it is immaterial whether the door is hinged at its rear edge or at its front edge. If the rectangular door is hinged at its rear edge the latch structure would be near the front edge of the door, and therefore the glassing of the window opening above this latch structure would consist of a fixed pane, as has been described; but if the hinging of the rectangular door is at its front edge the latch structure would be near the rear edge of the door and the solid door structure would then extend above the latch, so that at this particular location there would be no glassing whatsoever since it would be unnecessary, and the entire glass pane in the opening in the upper portion of the door would be arranged to slide up and down, and the front or hinge portion of the door would be constructed with a narrow strip precisely the same as the strip 9 illustrated at Figure 1.

The guide strip 7 might, in some instances, be dispensed with and the two panes overlapped as shown at Figure 3, but this strip 7 is preferably retained.

I claim:—

1. The hereindescribed improvement in the construction of a closed automobile body, comprising a narrow pillar post for the windshield, and a door adjacent thereto and provided with a fixed glass pane above the door latch equipment and a vertically slidable glass pane beyond said fixed pane.

2. The hereindescribed improvement in the construction of a closed automobile body, comprising a narrow pillar post for the windshield, and a door which completely fills the space between said post and the rear door casing, the upper portion of said door being glassed by a comparatively narrow fixed pane above the latch equipment and a comparatively wide and vertically slidable pane adjacent said fixed pane, said panes as an entirety extending substantially throughout the entire width of the door, whereby a clear vision is had at the front corner portions of said body.

3. A construction as in claim 1, in which the opening for the glass in the upper part of the door is laterally bounded at the front of the automobile body by a narrow strip that forms that part of the door adjacent said post, whereby a clear vision is had at the front corner portions of said body.

In testimony whereof I affix my signature hereto.

WILLIAM BREWSTER.